2,933,159
VEHICLE EMERGENCY BRAKE
Hibbard H. Stiebinger, San Pablo, Calif.

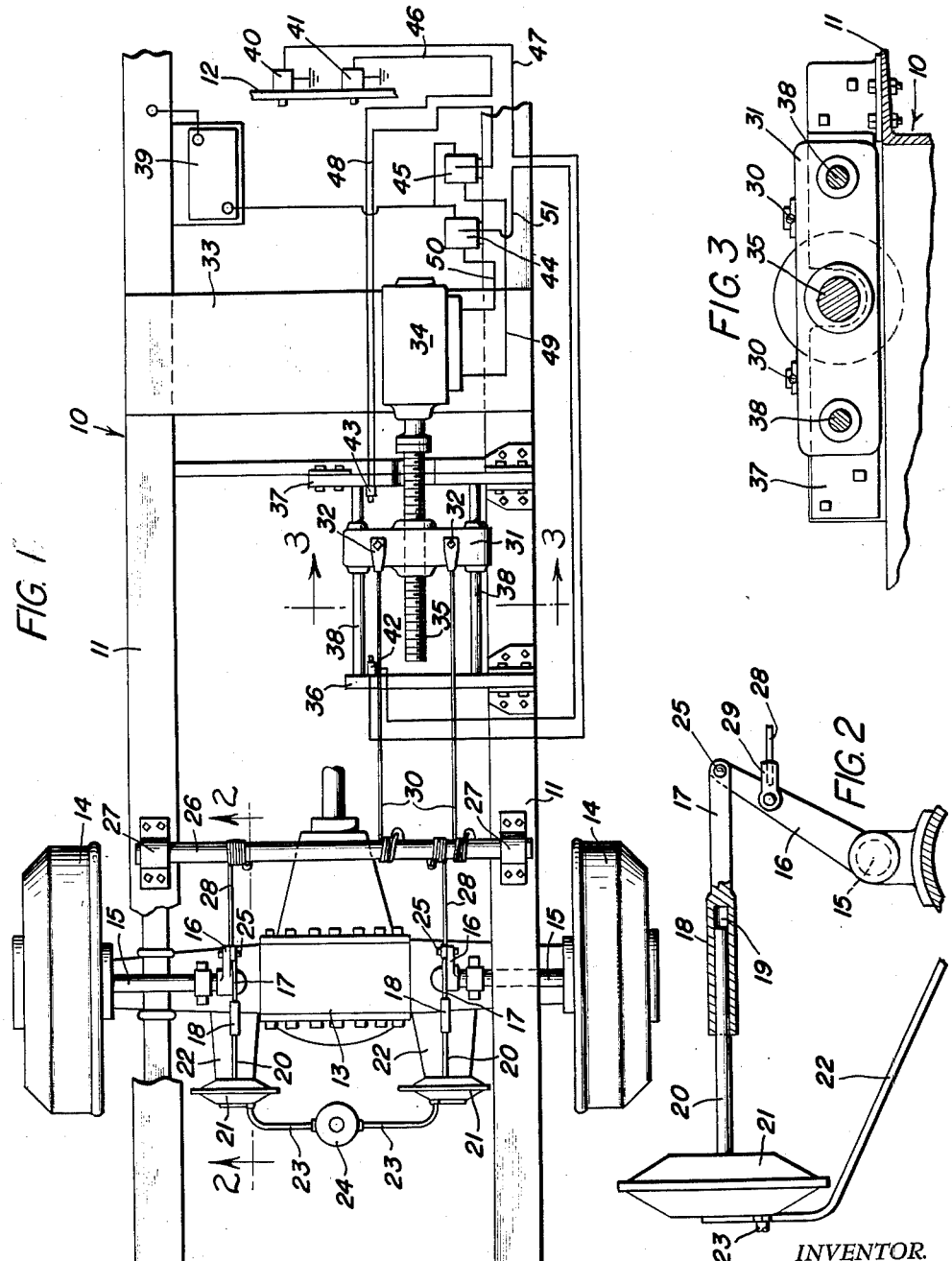

Application January 24, 1958, Serial No. 711,066

2 Claims. (Cl. 188—106)

This invention relates to a vehicle, and more particularly to an emergency brake for a vehicle.

This invention is an improvement over the emergency brake shown and described in my prior patent application, Serial No. 589,394, filed June 5, 1956, now Patent No. 2,825,428.

The object of the invention is to provide an emergency brake system for use on a vehicle such as an automobile or truck, so that in the event of a failure of the regular brake system of the vehicle, the present invention can be readily actuated so as to stop movement or motion of the vehicle which is equipped therewith.

Another object of the invention is to provide an emergency brake mechanism which includes an electrically operated means which is adapted to be actuated by switches positioned at a convenient location such as adjacent the dashboard of a vehicle, so that by actuating the switches, the brakes on the brake drums of the vehicle can be actuated whereby motion of the vehicle can be stopped even though there is a failure in the regular brakes on the vehicle.

A further object of the invention is to provide an emergency brake mechanism which utilizes inexpensive parts and which is reliable in operation and other objects and advantages are to provide an improved brake system for the purposes set forth that is economical to produce, simple to install, and fully effective in performing its intended operations.

Other ancillary objects of the invention which will later become apparent as the following description proceeds, are realized by my invention, one embodiment of which has been illustrated in the accompanying drawings, wherein:

Figure 1 is a fragmentary plan view illustrating the principle of the present invention.

Figure 2 is a sectional view taken on the line 2—2 of Figure 1.

Figure 3 is a sectional view taken on the line 3—3 of Figure 1.

Referring in detail to the drawings, the numeral 10 indicates a portion of a vehicle chassis and the chassis 10 includes the usual spaced parallel horizontally disposed beams 11. The vehicle further includes a dashboard or instrument panel 12, a differential 13, as well as wheel drums 14 of conventional construction. Connected to the wheel drums 14 are brake rods 15 which are adapted to be rotated when the brakes in the wheel drums 14 are to be energized or actuated.

The present invention is directed to an emergency brake system which can be used for moving the rods 15 in the event of failure of the conventional vehicle brakes so that motion or movement of the vehicle can be stopped when desired. The emergency brake system of the present invention includes a pair of spaced apart arms 16 which are secured to inner ends of the rods 15, Figures 1 and 2. The numeral 17 indicates bars which have their front ends pivotally connected to the upper ends of the arms 16 by means of pivot pins 25. Each of the bars 17 is provided with an enlarged rear portion 18 which is hollow or recessed as at 19, and the numeral 20 indicates plungers or rods which telescopically engage the recesses 19. These plungers 20 are connected to diaphragm housings 21 which may be supported by members 22, and the diaphragm housings or fluid motors 21 have conduits or lines 23 extending to a conventional relay valve 24.

There is further provided a horizontally disposed shaft or rod 26 which has its ends engaging bearings 27, and the bearings 27 are secured to the beams 11. A first pair of cables 28 are trained over the shaft 26, and the cables 28 are connected to the arms 16 through the medium of bushings 29.

As shown in the drawings, there is provided a second pair of cables 30 which are also trained over and connected to the shaft 26, and the cables 30 are fastened to a movable follower 31 by means of connectors 32.

Extending transversely between the beams 11 and secured thereto is a support member 33 which provides a support for a conventional reversible electric motor 34. The motor 34 has a screw member 35 extending rearwardly therefrom and driven thereby, and the screw member 35 extends through and engages the movable follower 31.

As shown in the drawings, spaced apart braces 36 and 37 are secured to the chassis, and these braces have extending therebetween, a plurality of spaced parallel guide members 38 which provide a slidable support for the movable follower 31 so that the follower 31 will be maintained in the proper position as it moves back and forth.

In Figure 1 the numeral 39 indicates the vehicle battery, while the numerals 40 and 41 indicate manually operable switches which are adapted to be supported by the instrument panel or dashboard 12. There is further provided limit stop switches 42 and 43 which are adapted to be engaged by the movable follower 31 so as to control movement of this member. There is further provided solenoid relays 44 and 45 which are connected in the electrical circuit.

The electrical circuit is shown to comprise wires 46 and 47 which are connected to the switches 41 and 40, and wires 48 and 49 are electrically connected to the solenoid relay 45. Wires 50 and 51 are electrically connected to the solenoid relay 44.

From the foregoing, it is apparent that there has been provided an emergency brake mechanism which is an improvement over the emergency brake shown and described in my prior patent application, Serial No. 589,394. With the parts arranged as shown in the drawings, it will be seen that normally the vehicle brakes are actuated in the usual manner so that the mechanism of the present invention is not utilized until a failure occurs in the regular brake system of the vehicle. Then, in the event of a failure in the brake system, a switch such as the switch 40 which is mounted on the dashboard of the vehicle can be actuated, and this actuation of the switch 40 serves to actuate the solenoid relay 44 which in turn actuates the motor 34 so as to rotate the screw member 35. As the screw member 35 rotates, the follower 31 will be moved from left to right in Figure 1 or in a forward direction, and the follower 31 is guided by the members 38 which are supported by the braces 36 and 37. This forward motion of the follower 31 causes corresponding movement of the cables 30 which are fastened to the follower 31 by means of the connectors 32, and this motion of the cables 30 will cause rotation of the shaft 26 in the bearings 27. As the shaft 26 rotates, the pair of cables 28 will be moved, and since the cables 28 are connected to the arms 16 by means of the bushings 29, it will be seen that there will result in corresponding rocking or pivotal movement of the arms 16. The arms 16 are secured to ends of the brake rods 15, and the brake rods 15 are connected to the usual brake mechanism in the wheel drums 14 so that the previously described rotation of the shaft 26 will result in actuation of the rods 15 and brake mechanisms in the wheel drums 14 so that motion of the vehicle will be stopped. When the follower 31 engages the limit switch 43, the electrical circuit to the motor 34 will be interrupted and this arrangement prevents the follower 31 from traveling beyond its proper limit of travel. By actuating the other switch 41, the solenoid relay 45 can be actuated to thereby cause the motor 34 to operate in the reverse direction so that the screw member 35 will be rotated in the reverse direction and this will cause rearward movement of the follower 31 on the guide members 38. Thus, the reverse movement of the follower 31 can be used for releasing tension on the cables 30 so that by properly actuating the air relay valve 24, the diaphragm housing 21 will be actuated to thereby actuate the plungers 20 so as to permit movement of the bars 17. The limit switch 42 serves to interrupt the circuit to the motor 34 when the follower 31 reaches the limit of its rearward travel so as to prevent damage to the parts.

Thus, it will be seen that there has been provided an emergency brake system which is an improvement over the brake system shown and described in my prior patent application, and wherein according to the present invention motion of the vehicle will be stopped whenever switches such as the switch 40 is manually operated by the driver of the vehicle. Thus, even though the regular or conventional brake may fail, the motion of the vehicle can be stopped safely.

The parts can be made of any suitable material and in different shapes or sizes.

The members 21 constitute air pots, and the switch 40 can be used for causing the motor 34 to travel in a forward direction, while the switch 41 can be used for operating the motor in a reverse direction.

With the present invention, the number of elements present in my prior application such as the pressure plate, clutch and the one way motor and electric air switch are eliminated.

In use, the starter switch 40 serves to operate the motor 34 in one direction which in turn rotates the screw member 35 so as to move the follower 31 in a forwardly direction. The switch 41 serves to reverse operation of the motor 34 and pulls the follower 31 in a reverse direction which in turn draws the cables on the equalizer bar so as to set the slack adjuster on the axles to the brakes. The guide members 38 serve to keep the follower from tipping so that the follower will move in either direction depending upon the rotation of the motor. The electric stop switches 42 and 43 serve to prevent the follower and motor from overrunning the track.

I claim:

1. In a vehicle, a chassis including spaced parallel beams, spaced apart wheel drums, brake rods connected to said wheel drums, a pair of spaced apart arms secured to the inner ends of said rods, a bar extending rearwardly from the upper end of each arm, said bars including hollow enlarged rear portions, stationarily mounted fluid motors having plungers extending therefrom, said plungers slidably engaging said hollow rear portions, an air relay valve connected to said fluid motors, a horizontally disposed shaft extending between the beams of said chassis and supported thereby, a first pair of cables trained over said shaft and extending rearwardly from the shaft and connected to said arms, a second pair of cables connected to said shaft and extending forwardly therefrom, a movable follower connected to the front ends of said second cables, a support member extending between said beams, a reversible motor supported by said support member, a screw member extending rearwardly from said reversible motor and engaging said follower, spaced apart braces secured to said chassis, spaced parallel guide members extending between said braces and providing a slidable support for the follower, solenoid relays electrically connected to said reversible motor, and manually operable switches electrically connected to said solenoid relays.

2. In a vehicle, a chassis including spaced parallel beams, spaced apart wheel drums, brake rods connected to said wheel drums, a pair of spaced apart arms secured to the inner ends of said rods, a bar extending rearwardly from the upper end of each arm, said bars including hollow enlarged rear portions, stationarily mounted fluid motors having plungers extending therefrom, said plungers slidably engaging said hollow rear portions, an air relay valve connected to said fluid motors, a horizontally disposed shaft extending between the beams of said chassis and supported thereby, a first pair of cables trained over said shaft and extending rearwardly from the shaft and connected to said arms, a second pair of cables connected to said shaft and extending forwardly therefrom, a movable follower connected to the front ends of said second cables, a support member extending between said beams, a reversible motor supported by said support member, a screw member extending rearwardly from said reversible motor and engaging said follower, spaced apart braces secured to said chassis, spaced parallel guide members extending between said braces and providing a slidable support for the follower, solenoid relays electrically connected to said reversible motor, and manually operable switches electrically connected to said solenoid relays, and a pair of spaced apart limit stop switches for engagement by said follower.

References Cited in the file of this patent

UNITED STATES PATENTS

| | | |
|---|---|---|
| 1,187,372 | Nilsen | June 13, 1916 |
| 2,070,365 | Leventis et al. | Feb. 9, 1937 |
| 2,162,852 | Mayes | June 20, 1939 |
| 2,251,521 | McIntyre et al. | Aug. 5, 1941 |
| 2,670,817 | Tripp | Mar. 2, 1954 |
| 2,738,037 | Balcerek et al. | Mar. 13, 1956 |
| 2,825,428 | Stiebinger | Mar. 4, 1958 |

FOREIGN PATENTS

| | | |
|---|---|---|
| 875,001 | Germany | Apr. 30, 1953 |